(12) United States Patent
Sugimura et al.

(10) Patent No.: US 9,042,786 B2
(45) Date of Patent: *May 26, 2015

(54) ROTATION DRIVING FORCE TRANSMITTING MEMBER, PHOTORECEPTOR DRUM, PROCESS CARTRIDGE, AND IMAGE FORMING APPARATUS

(71) Applicant: Sharp Kabushiki Kaisha, Osaka-shi, Osaka (JP)

(72) Inventors: Hiroshi Sugimura, Osaka (JP); Akihiro Kondoh, Osaka (JP); Akiko Kihara, Osaka (JP); Mami Adachi, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,033

(22) Filed: Jun. 20, 2014

(65) Prior Publication Data

US 2014/0348538 A1    Nov. 27, 2014

Related U.S. Application Data

(63) Continuation of application No. 13/237,431, filed on Sep. 20, 2011, now Pat. No. 8,798,505.

(30) Foreign Application Priority Data

Sep. 29, 2010    (JP) .................................. 2010-22036

(51) Int. Cl.
*G03G 15/00*    (2006.01)
*F16D 1/10*    (2006.01)
(Continued)

(52) U.S. Cl.
CPC .......... *G03G 15/757* (2013.01); *Y10T 403/7005* (2015.01); *F16D 1/101* (2013.01); *F16D 2001/102* (2013.01); *G03G 21/186* (2013.01); *F16D 3/10* (2013.01)

(58) Field of Classification Search
None
See application file for complete search history.

(56) References Cited

U.S. PATENT DOCUMENTS 5,023,660 A    6/1991    Ebata et al.
6,035,159 A    3/2000    Azuma et al.
(Continued)

FOREIGN PATENT DOCUMENTS

CN    1179559 A    4/1998
CN    200996415 Y    12/2007
(Continued)

OTHER PUBLICATIONS

Yamamoto et al., Electrohphotographic Color Printer Engine, OKI Technical Review, vol. 64, pp. 15-20 (Aug. 1998).
(Continued)

*Primary Examiner* — David Gray
*Assistant Examiner* — Sevan A Aydin
(74) *Attorney, Agent, or Firm* — Nixon & Vanderhye P.C.

(57) ABSTRACT

A rotation driving force transmitting member is disposed between a motor section and a main body of a photoreceptor drum. The rotation driving force transmitting member has a convex member which is provided on the photoreceptor drum side and includes a twisted convex portion with an elliptical cross-section and a concave member which is provided on the motor section side and includes a twisted concave portion with an elliptical cross-section, the concave portion being fitted in the convex portion. The rotation driving force transmitting member transmits rotation driving force by the motor section to the photoreceptor drum via the convex member and the concave member in a state where the convex member is subjected to a drawing force toward the concave member side, due to rotation of the motor section in a state where the convex portion and the concave portion are fitted in each other.

15 Claims, 5 Drawing Sheets

(51) Int. Cl.
*G03G 21/18* (2006.01)
*F16D 3/10* (2006.01)

(56) References Cited

U.S. PATENT DOCUMENTS

| 6,175,706 | B1 | 1/2001 | Watanabe et al. |
| 6,226,478 | B1 | 5/2001 | Watanabe et al. |
| 2002/0110388 | A1 | 8/2002 | Yokomori et al. |
| 2003/0059233 | A1 | 3/2003 | Jang et al. |

FOREIGN PATENT DOCUMENTS

| JP | 62-65049 | 3/1987 |
| JP | 09-025782 | 1/1997 |
| JP | 10-104905 | 4/1998 |
| JP | 2875203 | 1/1999 |
| JP | 2002-304106 | 10/2002 |
| JP | 2003-148503 | 5/2003 |

OTHER PUBLICATIONS

Machine translation of Fukuda et al., JP H09-025782.

ROTATION DRIVING FORCE TRANSMITTING MEMBER, PHOTORECEPTOR DRUM, PROCESS CARTRIDGE, AND IMAGE FORMING APPARATUS

CROSS-REFERENCE TO RELATED APPLICATION

This application is a continuation of U.S. patent application Ser. No. 13/237,431, filed Sep. 20, 2011, which claims priority to Japanese Patent Application No. 2010-22036, filed Sep. 29, 2010, the entire contents of which are hereby incorporated by reference in its entirety.

BACKGROUND OF THE TECHNOLOGY

1. Field of the Technology

The present technology relates to a rotation driving force transmitting member, a photoreceptor drum, a process cartridge, and an image forming apparatus.

2. Description of the Related Art

A duplicator, a printer, a facsimile machine, or the like includes an image forming apparatus which forms an image using electrophotography. In the electrophotographic image forming apparatus, a electrostatic latent image is formed on a surface of a photoreceptor drum by a charging section and a exposure section, the electrostatic latent image is developed due to supply of a toner by a developing section, a toner image on the surface of the photoreceptor drum is transferred to a recording medium such as a recording sheet by a transfer section, the toner image is fixed on the recording sheet by a fixing section, and the image is formed.

A rotation driving force from a motor or the like, which is provided in the image forming apparatus, is transmitted to the photoreceptor drum via a rotation driving force transmitting member such as gears or coupling members. Therefore, the photoreceptor drum is constituted so as to be rotated around an axial line thereof. In addition, in a process cartridge described in Japanese Unexamined Patent Publication JP-A 62-65049 (1987), members other than the photoreceptor drum in the process cartridge as well as the photoreceptor drum are constituted so as to be rotated by the motor and the like which is provided in the image forming apparatus. Here, in the process cartridge, the photoreceptor drum, the charging section, the developing section, and the like are integrally constituted as one cartridge. Therefore, for example, a developing roller included in the developing section is also rotated as the photoreceptor drum is rotated.

In Japanese Examined Patent Publication JP-B2 2875203 and Japanese Unexamined Patent Publication JP-A 10-104905 (1998), a rotation driving force transmitting member is described. The rotation driving force transmitting member includes: a driving rotation body which is rotated by a rotation driving force of a motor, and in the center portion thereof, a concave portion, which has a polygonal cross-section and is twisted, is formed; and a convex portion that is provided in one end in a longitudinal direction of a photoreceptor drum, fitted in the concave portion of the driving rotation body, has a polygonal cross-section, and is twisted. Due to rotation of the driving rotation body in a state where the concave portion and the convex portion are fitted in each other, the rotation driving force transmitting member is constituted so that a rotation driving force of the motor is transmitted to the photoreceptor drum via the driving rotation body and the convex portion in a state where the convex portion is subjected to a drawing force toward the concave portion side.

In the rotation driving force transmitting members described in JP-B2 2875203 and JP-A 10-104905, even though a centroid of the polygonal cross-section of the convex portion is misaligned with a centroid of the polygonal cross-section of the concave portion in a state before the concave portion starts rotation, if the concave portion starts rotation, the tips of the corners of the polygonal cross-section of the convex portion abut against the side portions of the polygonal cross-section of the concave portion due to a drawing force between the concave portion and the convex portion, and the two centroids are aligned with each other. As a result, it is possible to rotate the photoreceptor drum provided with the convex portion without eccentricity.

However, the rotation driving force transmitting members which are described in JP-82 2875203 and JP-A 10-104905 have the following problems. That is, due to the impact when the concave portion starts rotation and the tips of the corners of the polygonal cross-section of the convex portion abut against the side portions of the polygonal cross-section of the concave portion, the tips of the corners are easily damaged. In addition, the tips of the corners of the polygonal cross-section of the convex portion are easily damaged even when the convex portion and the concave portion are fitted in each other. Moreover, if the tips of the corners of the polygonal cross-section of the convex portion is damaged, for example, even though the damage is minute, the abutment positions between the polygonal cross-section of the convex portion and the polygonal cross-section of the concave portion are misaligned, and the centroid of the polygonal cross-section of the convex portion is misaligned with the centroid of the polygonal cross-section of the concave portion. Therefore, a backlash occurs in rotation of the photoreceptor drum.

SUMMARY OF THE TECHNOLOGY

The technology is made in consideration of the above-described problems, and an object thereof is to provide a rotation driving force transmitting member capable of suppressing occurrence of a backlash in a rotation of a driven body, as well as a photoreceptor drum, a process cartridge, and an image forming apparatus.

The technology provides a rotation driving force transmitting member disposed between a driving source which is rotated around an axial line, and a driven body, the rotation driving force transmitting member comprising:

a convex member provided on one of the driving source and the driven body, the convex member including a convex portion that has an elliptical cross-section and is twisted; and a concave member provided on the other of the driving source and the driven body, the concave member including a concave portion that has an elliptical cross-section, is twisted, and is fitted in the convex portion, a rotation driving force of the driving source being transmitted to the driven body via the convex member and the concave member in a state where the convex member is subjected to a drawing force toward the concave member side, due to rotation of the driving source in a state where the convex portion and the concave portion are fitted in each other.

When the driving source starts rotation in the state where the convex portion of the convex member and the concave portion of the concave member are fitted in each other, a drawing force, which draws the convex member to the concave member side, is generated. Moreover, in the state where the drawing force is generated, the rotation driving force is transmitted to the driven body via the convex member and the concave member by the driving source.

At this time, due to the drawing force which is generated between the convex member and the concave member, the arc portion of the elliptical cross-section of the convex portion abuts against the arc portion of the elliptical cross-section of the concave portion, and a centroid of the elliptical cross-section of the convex portion is aligned with a centroid of the elliptical cross-section of the concave portion. As a result, it is possible to rotate the driven body provided with any one of the convex member and the concave member without eccentricity.

Moreover, when the arc portion of the elliptical cross-section of the convex portion abuts against the arc portion of the elliptical cross-section of the concave portion, the impact at the time of abutment can be alleviated, and therefore, damage in the convex portion is suppressed. In addition, the convex portion is hardly damaged even when the convex portion and the concave portion are fitted in each other.

In addition, since the convex member and the concave member are constituted so that the centroid in the elliptical cross-section of the convex portion is aligned with a centroid in the elliptical cross-section of the concave portion due to abutment of the arc portion of the elliptical cross-section of the convex portion against the arc portion of the elliptical cross-section of the concave portion, even though damage occurs in the convex portion, if the damage is minute, a portion of the arc portion of the elliptical cross-section of the convex portion is remained. As a result, the misalignment does not occur in the abutment position between the convex portion and the concave portion, the centroids of the convex portion and the concave portion can be aligned with each other. Therefore, in the rotation driving force transmitting member according to the technology, it is possible to suppress occurrence of a backlash in rotation of the driven body.

Further, it is preferable that a shape of the cross-section of the convex portion of the convex member is an ellipse in which a ratio between a major-axis length and a minor-axis length of the ellipse is 1.1 or more and 1.5 or less, and a shape of the cross-section of the concave portion of the concave member is ellipse in which a ratio between a major-axis length and a minor-axis length of the ellipse is 1.1 or more and 1.5 or less.

A shape of the cross-section of the convex portion of the convex member is the ellipse in which a ratio between the major-axis length and the minor-axis length of the ellipse is 1.1 or more and 1.5 or less, and a shape of the cross-section of the concave portion of the concave member is the ellipse in which a ratio between the major-axis length and the minor-axis length of the ellipse is 1.1 or more and 1.5 or less. Therefore, the elliptical cross-section of the convex portion and the elliptical cross-section of the concave portion are shapes which are near to a true circle shape. As a result, when the arc portion of the elliptical cross-section of the convex portion abuts against the arc portion of the elliptical cross-section of the concave portion, the length of the abutted arc portion becomes long, and the impact at the time of abutment can be more alleviated. In addition, since the elliptical cross-sections of the convex portion and the concave portion are shapes which are near to a true circle shape, the fitting between the convex portion and the concave portion can be easily performed.

Moreover, it is preferable that a twisted amount of the convex portion of the convex member and a twisted amount of the concave portion of the concave member are 1°/mm or more and 15°/mm or less.

Since the twisted amount of the convex portion of the convex member and the twisted amount of the concave portion of the concave member is 1°/mm or more and 15°/mm or less. Therefore, it is possible to reliably align the centroid of the elliptical cross-section of the convex portion and the centroid of the elliptical cross-section of the concave portion.

The technology provides a photoreceptor drum that is provided in an image forming apparatus comprising one of the convex member and the concave member which is provided in the rotation driving force transmitting member mentioned above and a motor serving as a driving source, and that serves as a driven body which is rotated by a rotation driving force of the motor, the photoreceptor drum comprising:

a flange having the other one of the convex member and the concave member provided in an end in an axial line direction of the photoreceptor drum, and constituted to align the axial line direction of the photoreceptor drum with an axial line direction of the other one member.

Since the flange includes any one of the convex member and the concave member and is constituted to align the axial line direction of the one member with the axial line direction of the photoreceptor drum, it is possible to suppress occurrence of a backlash in rotation of the photoreceptor drum. In addition, the technology provides a process cartridge comprising:

the photoreceptor drum mentioned above; and a charging section that charges the photoreceptor drum.

According to such constitution, it is possible to provide the process cartridge including the photoreceptor drum and the charging section that charges the photoreceptor drum.

In addition, it is preferable that the process cartridge further comprises a cleaning section that cleans the surface of the photoreceptor drum.

According to such constitution, it is possible to provide the process cartridge including the photoreceptor drum, the charging section, and the cleaning section that cleans the surface of the photoreceptor drum.

In addition, it is preferable that, the process cartridge is constituted so that the rotation driving force, which is transmitted to the photoreceptor drum, is transmitted to the cleaning section.

Since the process cartridge is constituted so that the rotation driving force, which is transmitted to the photoreceptor drum, is transmitted to the cleaning section, it is possible to rotate the photoreceptor drum and the cleaning section simultaneously by the rotation driving force of the motor.

Moreover, it is preferable that the process cartridge further comprises a developing section that supplies a toner to the photoreceptor drum.

According to such constitution, it is possible to provide the process cartridge including the photoreceptor drum, the charging section, the cleaning section, and the developing section that supplies the toner to the photoreceptor drum.

It is preferable that the process cartridge is constituted so that the rotation driving force, which is transmitted to the photoreceptor drum, is transmitted to the developing section.

Since the process cartridge is constituted so that the rotation driving force, which is transmitted to the photoreceptor drum, is transmitted to the developing section, it is possible to rotate the photoreceptor drum and the developing section simultaneously by the rotation driving force of the motor.

Furthermore, the technology provides a process cartridge that is provided in an image forming apparatus comprising one of the convex member and the concave member which is provided in the rotation driving force transmitting member mentioned above and a motor that serves as a driving source, the process cartridge comprising:

a developing section that serves as a driven body which is rotated by the rotation driving force of the motor, and has the other one of the convex member and the concave member.

Since the process cartridge includes the developing section having any one of the convex member and the concave member is provided, the developing section can be rotated by the rotation driving force of the motor, and it is possible to suppress occurrence of a backlash in rotation of the developing section.

Furthermore, the technology provides an electrophotographic image forming apparatus comprising:

one of the convex member and the concave member that is provided in the rotation driving force transmitting member mentioned above;

a motor that serves as a driving source; and the process cartridge mentioned above.

According to such constitution, it is possible to provide the image forming apparatus including the process cartridge.

In addition, it is preferable that the image forming apparatus further comprises an intermediate transfer section including an intermediate transfer belt and an intermediate transfer belt driving roller which rotates the intermediate transfer belt, and the image forming apparatus is constituted so that the rotation driving force, which is transmitted to the photoreceptor drum, is transmitted to the intermediate transfer belt driving roller.

Since the image forming apparatus further includes the intermediate transfer section including the intermediate transfer belt and the intermediate transfer belt driving roller which rotates the intermediate transfer belt, and is constituted so that the rotation driving force transmitted to the photoreceptor drum is transmitted to the intermediate transfer belt driving roller, the photoreceptor drum and the intermediate transfer belt driving roller can be rotated simultaneously, and the intermediate transfer belt can be rotated due to the rotation driving force of the motor.

The technology provides an electrophotographic image forming apparatus comprising:

one of the convex member and the concave member provided in the rotation driving force transmitting member mentioned above;

a motor that serves as a driving source; and an intermediate transfer section including an intermediate transfer belt driving roller that serves as a driven body which is rotated by the rotation driving force of the motor and an intermediate transfer belt which is rotated by the intermediate transfer belt driving roller, the intermediate transfer belt driving roller having the other one of the convex member and the concave member.

Since the image forming apparatus includes the intermediate transfer belt driving roller having any one of the convex member and the concave member and the intermediate transfer belt which is rotated by the intermediate transfer belt driving roller, the intermediate transfer belt driving roller can be rotated by the rotation driving force of the motor, and it is possible to suppress occurrence of a backlash in rotation of the intermediate transfer belt driving roller. In addition, the intermediate transfer belt can be rotated by rotation of the intermediate transfer belt driving roller.

BRIEF DESCRIPTION OF THE DRAWINGS

Other and further objects, features, and advantages will be more explicit from the following detailed description taken with reference to the drawings wherein.

DETAILED DESCRIPTION

Now referring to the drawings, preferred embodiments are described below.

Figure 1:
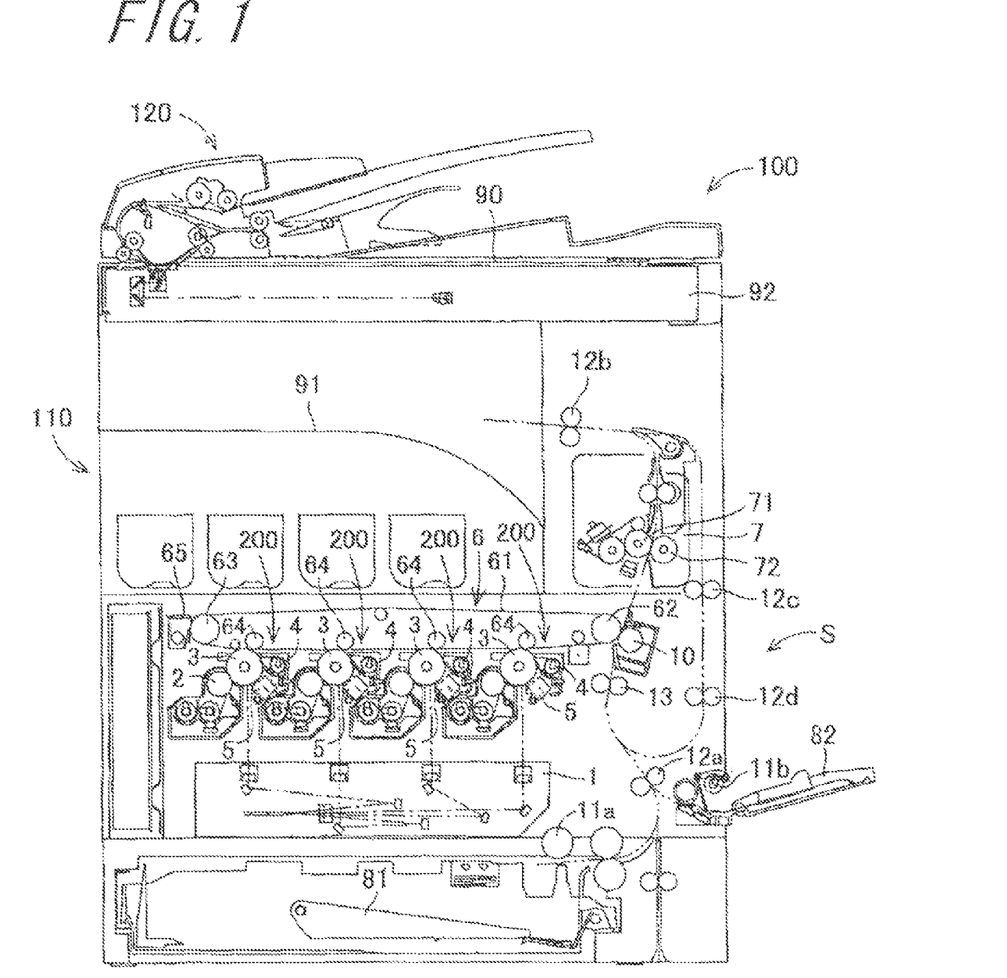
FIG. 1 is a schematic view showing the entire configuration of a multifunctional peripheral.
Figure 2:
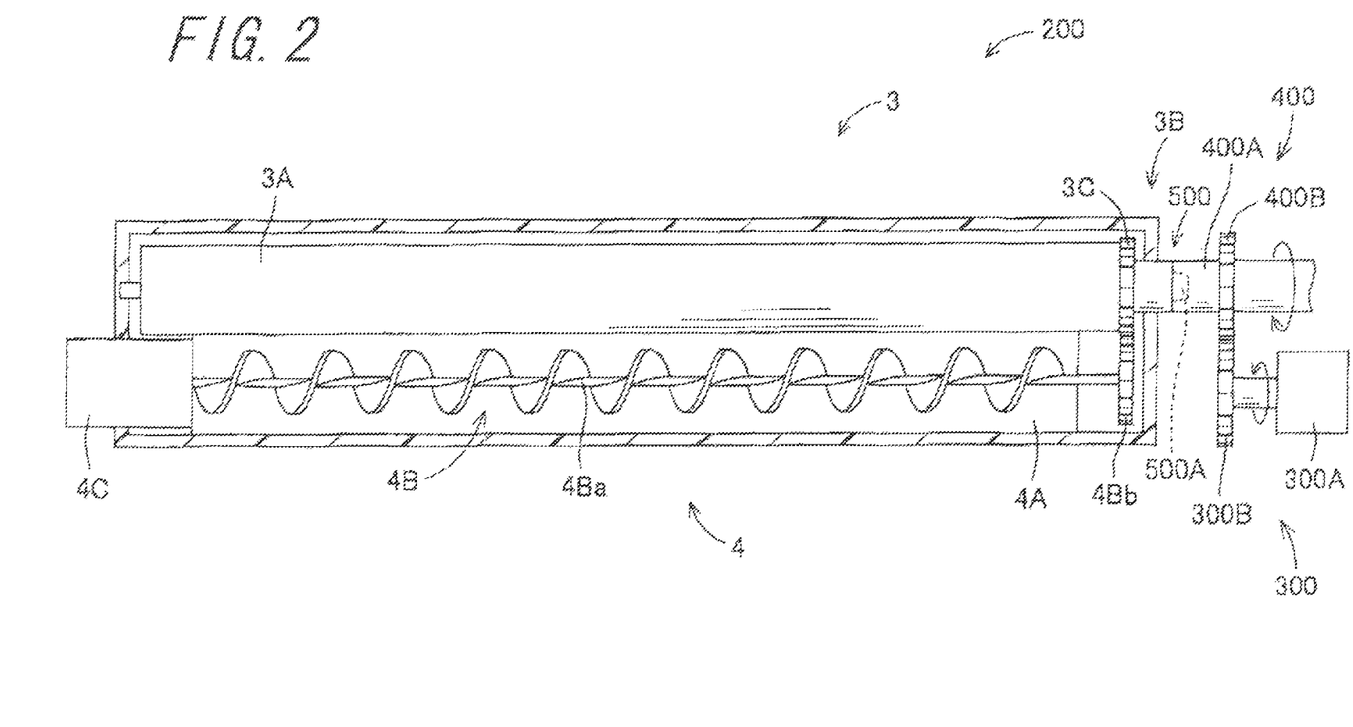
FIG. 2 is a schematic view showing a process cartridge and a periphery of the process cartridge provided in the multifunctional peripheral.

Hereinafter, a multifunctional peripheral 100 including a process cartridge 200 according to an embodiment, will be described, FIG. 1 is a schematic view showing the entire configuration of the multifunctional peripheral 100 according to the embodiment. FIG. 2 is a schematic view showing the process cartridge 200 and a periphery of the process cartridge 200 provided in the multifunctional peripheral 100. The multifunctional peripheral 100 which is an image forming apparatus is an apparatus that forms multicolor or monochromatic images on a recording medium such as a recording sheet based on an image data. In addition, the multifunctional peripheral 100 comprises an apparatus main body 110 including a process cartridge 200 and an automatic original document processing device 120.

The apparatus main body 110 includes an original document platen 90 on which the original document is to be placed at a vertically upper portion thereof and which is formed of a transparent glass, and a reading section 92. The automatic original document processing device 120 is mounted on a vertically upper side of the original document platen 90. The automatic original document processing device 120 is a device that conveys the original document onto the original document platen 90. The automatic original document processing device 120 is constituted so as to be angularly displaceable in a direction which is separated from the original document platen 90, and the original document can be manually placed on the original document platen 90. Image information of the original document, which is placed on the original document platen 90, is read by the reading section 92, and is inputted to a control section (not shown).

The apparatus main body 110 includes an exposure section 1, a developing section 2, an intermediate transfer section 6, a secondary transfer roller 10, a fixing section 7, an inner sheet feed cassette 81, a manual sheet feed cassette 82, a catch tray 91, a process cartridge 200, a motor section 300, a concave member 400, and a recording medium conveying section S. The process cartridge 200 includes a photoreceptor drum 3, a cleaning section 4, and a charging section 5. The process cartridge 200 can be attached to and detached from the apparatus main body 110. In addition, in a state where the process cartridge 200 is mounted on the apparatus main body 110, the process cartridge 200 is constituted so as to move in a direction which is parallel to an axial line of the photoreceptor drum 3.

An image data, which is processed in the multifunctional peripheral 100, corresponds to a color image that uses each color of black (K), cyan (C), magenta (M), and yellow (Y). Therefore, the developing section 2, the photoreceptor drum 3, the charging section 5, the cleaning section 4, the motor section 300, and the concave member 400 each are provided by four according to each color.

The motor section 300 includes a motor section main body 300A and a gear 300B. The gear 300B is rotated around an axial line thereof by a rotation driving force from the motor section main body 300A. The concave member 400 includes a concave portion 400A and a gear portion 400B. The gear portion 400B is engaged with the gear 300B of the motor section 300, and entire concave member 400 is rotated around the axial line of the concave portion 400A due to rotation of the gear 300B.

The photoreceptor drum 3 includes a main body 3A and a flange 3B. The main body 3A is a cylindrical member, which is constituted so as to be rotatable around the axial line of the main body 3A. The main body 3A includes a conductive substrate (not shown) and a photosensitive layer which is formed on the surface of the conductive substrate. The photosensitive layer is a member which exhibits conductivity due to irradiation with light. An electric image referred to as an electrostatic latent image is formed on the surface of the photosensitive layer due to charging by the charging section 5 and exposure by the exposure section 1.

The flange 3B is provided in the one end in the axial line direction of the main body 3A, and a gear portion 3C and a convex member 500 are integrally molded. The convex member 500 includes a convex portion 500A, and the convex portion 500A and the concave portion 400A of the concave member 400 are fitted in each other. In the state where the convex portion 500A and the concave portion 400A are fitted in each other, if the concave member 400 is rotated around the axial line of the concave portion 400A, entire photoreceptor drum 3 is also rotated around the axial line of the concave portion 400A. That is, a rotation driving force from the motor section main body 300A which is a driving source, is transmitted to the photoreceptor drum 3 which is a driven body, via the concave member 400 and the convex member 500 which are a rotation driving force transmitting member. As a result, the photoreceptor drum 3 is rotated.

The charging section 5 is a device which charges a predetermined polarity and potential on the surface of the photoreceptor drum 3 by a corona discharge. The charging section 5 is arranged on a vertically lower side of the photoreceptor drum 3 and the cleaning section 4 along the longitudinal direction of the photoreceptor drum 3 at a position facing the photoreceptor drum 3.

The exposure section 1 irradiates the photoreceptor drum 3 with light. The exposure section 1 forms an electrostatic latent image on the surface of the photoreceptor drum 3 according to an image data due to exposure of the charged photoreceptor drum 3.

A laser scanning unit (LSD) can be used as the exposure section 1. The LSU includes a laser light emitting portion that emits a laser light which is modulated according to an image data; a polygon mirror that deviates the laser light which is emitted from the laser light emitting portion; a convergent lens that converges the laser light which is deflected by the polygon mirror; and a reflection mirror that reflects the laser light which is converged by the convergent lens. In addition, the exposure section 1 is not limited to the LSU, an EL (Electro Luminescence) writing head or a LED (Light Emitting Diode) writing head in which light emitting elements are arranged in an array, and the like may be used as the exposure section 1.

The developing section 2 is a member that visualizes the electrostatic latent image, which is formed on the photoreceptor drum 3, by the toner of each color of four colors (CMYK). The developing section 2 forms a toner image on the photoreceptor drum 3 by supplying the toner on the photoreceptor drum 3 which is in the state where the electrostatic latent image is formed.

The cleaning section 4 is a member that recovers the toner remaining on the surface of the photoreceptor drum 3 after the toner image is transferred to an intermediate transfer belt 61 described below. The cleaning section 4 includes a scraping portion 4A, a conveying portion 4B, and a recovering portion 4C.

The scraping portion 4A is a plate-shape member which abuts against the photoreceptor drum 3, and scrapes the remaining toner on the photoreceptor drum 3. The conveying portion 4B includes an auger screw-like conveying portion main body 4Ba and a gear 4Bb. The gear 4Bb is engaged with the gear portion 3C of the photoreceptor drum 3, and the entire conveying portion 4B is rotated due to transmission of the rotation driving force, which is transmitted from the motor section main body 300A to the photoreceptor drum 3, to the gear 4Bb via the gear portion 3C. As a result, the remaining toner, which is scraped by the scraping portion 4a, is conveyed to the recovering portion 4C through the conveying portion main body 4Ba. The recovering portion 4C is a detachable container-like member, and stores the remaining toner.

The intermediate transfer section 6 is disposed on a vertically upper side of the photoreceptor drum 3, and includes an intermediate transfer belt 61, an intermediate transfer belt driving roller 62, an intermediate belt driven roller 63, a primary transfer roller 64, and an intermediate transfer belt cleaning unit 65.

The intermediate transfer belt 61 is supported around the intermediate transfer belt driving roller 62, the intermediate transfer belt driven roller 63, and the primary transfer roller 64 with tension so as to come in contact with each photoreceptor drum 3. For example, the intermediate transfer belt 61 is formed in an endless shape by using a film having a thickness of about 100 µm to 150 µm. The intermediate transfer belt driving roller 62 and the intermediate transfer driven roller 63 rotate the intermediate transfer belt 61 in a predetermined direction.

Toner images of the respective colors formed on the photoreceptor drums 3 are sequentially transferred and overlaid onto the intermediate transfer belt 61, thereby forming a color toner image (a multicolor toner image). The toner image formed on the intermediate transfer belt 61 is conveyed to a position facing the secondary transfer roller 10 due to rotation of the intermediate transfer belt 61.

Four primary transfer rollers 64 are provided corresponding to each color of the CMYK. The primary transfer roller 64 applies a transfer bias, which is a voltage for transferring the toner image on the each photoreceptor drum 3 onto the intermediate transfer belt 61, to the intermediate transfer belt 61. The primary transfer roller 64 is a roller-like member that includes a metal (for example, a stainless steel) shaft having 8 mm to 10 mm in the diameter, and a conductive elastic material (for example, EPDM (ethylene propylene copolymer rubber), urethane foam, or the like) with which a surface of the metal shaft is coated. The primary transfer roller 64 can uniformly apply the transfer bias with respect to the intermediate transfer belt 61 by the conductive elastic material.

The secondary transfer roller 10 is a member that transfers a color toner image, which is formed on the intermediate transfer belt 61 described above, onto the recording medium. The secondary transfer roller 10 is disposed so as to sandwich the intermediate transfer belt 61 together with the intermediate transfer belt driving roller 62. A voltage for transferring the color toner image to the recording medium is applied to the secondary transfer roller 10. In order to form a nip by the secondary transfer roller 10 and the intermediate transfer driving roller 62, one of the secondary transfer roller 10 and the intermediate transfer belt driving roller 62 may be formed of a hard material (metal, or the like), the other one may be formed of a soft material (elastic rubber, foamable resin, or the like).

The intermediate transfer belt cleaning unit 65 is a member that recovers the toner which is remained on the intermediate transfer belt 61 after the color toner image has been transferred to the recording medium. The intermediate transfer belt cleaning unit 65 includes a cleaning blade which comes in contact with the intermediate transfer belt 61, and the cleaning blade sandwiches the intermediate transfer belt 61 together with the intermediate transfer belt driven roller 63.

The fixing section includes a heat roller 71 and a pressure roller 72. The heat roller 71 and the pressure roller 72 are provided so as to be rotatable and convey the recording medium while sandwiching it therebetween. The heat roller 71 is set so as to be a predetermined temperature by a control section (not shown) based on a signal from a temperature detector (not shown). The heat roller 71 and the pressure roller 72 apply heat and pressure to the toner constituting the color toner image to the recording medium to fuse the toner and fix it on the recording medium.

The inner sheet feed cassette 81 and the manual sheet feed cassette B2 are members that accumulates the recording medium such as the recording sheet used in the image formation. The catch tray 91 is a tray for accumulating the image-formed recording medium in a facedown manner.

The recording medium conveying section S is a member that feeds the recording medium from the inner sheet feed cassette 81 and the manual sheet feed cassette 82 to the catch tray 91 via the secondary transfer roller 10 and the fixing section 7. The recording medium conveying section S includes pick-up rollers 11a and 11b, conveying rollers 12a, 12b, 12c, and 12d, and registration rollers 13.

The pick-up roller 11a is a member that is provided in the vicinity of an end of the inner sheet feed cassette 81 and picks the recording mediums up one by one from the inner sheet feed cassette 81. The pick-up roller 11b is a member that is provided in the vicinity of an end of the manual sheet feed cassette 82 and picks the recording mediums up one by one from the manual sheet feed cassette 82.

The conveying rollers 12a to 12d are a small-size roller for conveying the recording medium. The registration rollers 13 are members that once hold the conveyed sheet and convey the recording medium to the secondary transfer roller 10 at the timing when the color toner image on the intermediate transfer belt 61 and the recording medium are registered.

In the multifunctional peripheral 100, the recording medium, which is picked up from the inner sheet feed cassette 81 or the manual sheet feed cassette 82, is conveyed to the registration rollers 13. Thereafter, the recording medium is conveyed to the secondary transfer roller 10 at a predetermined timing by the registration rollers 13, and the toner image is transferred onto the recording medium when the recording medium passes through between the secondary transfer roller 10 and the intermediate transfer belt 61. In the recording medium onto which the toner image is transferred, the toner image is fixed on the recording medium by passing the recording medium through the fixing section 7, and the recording medium is discharged to the catch tray 91 via the transport roller 12b.

In addition, in the multifunctional peripheral 100, in a case of performing a double-side printing in which images are formed at both sides of the recording medium, the recording medium is discharged from the fixing section 7 after the fixation of the toner image on one side of the recording medium has been completed, thereafter, a tail end of the recording medium is grasped by the conveying roller 12b and introduced to the conveying rollers 12c and 12d by the transport roller 12b. The recording sheet which is introduced to the conveying rollers 12c and 12d passes through the registration rollers 13, the secondary transfer roller 10, and the fixing section 7 again, thereby performing the printing of a back side of the printing medium, and then the printing medium is discharged to the catch tray 91.

Figure 3:
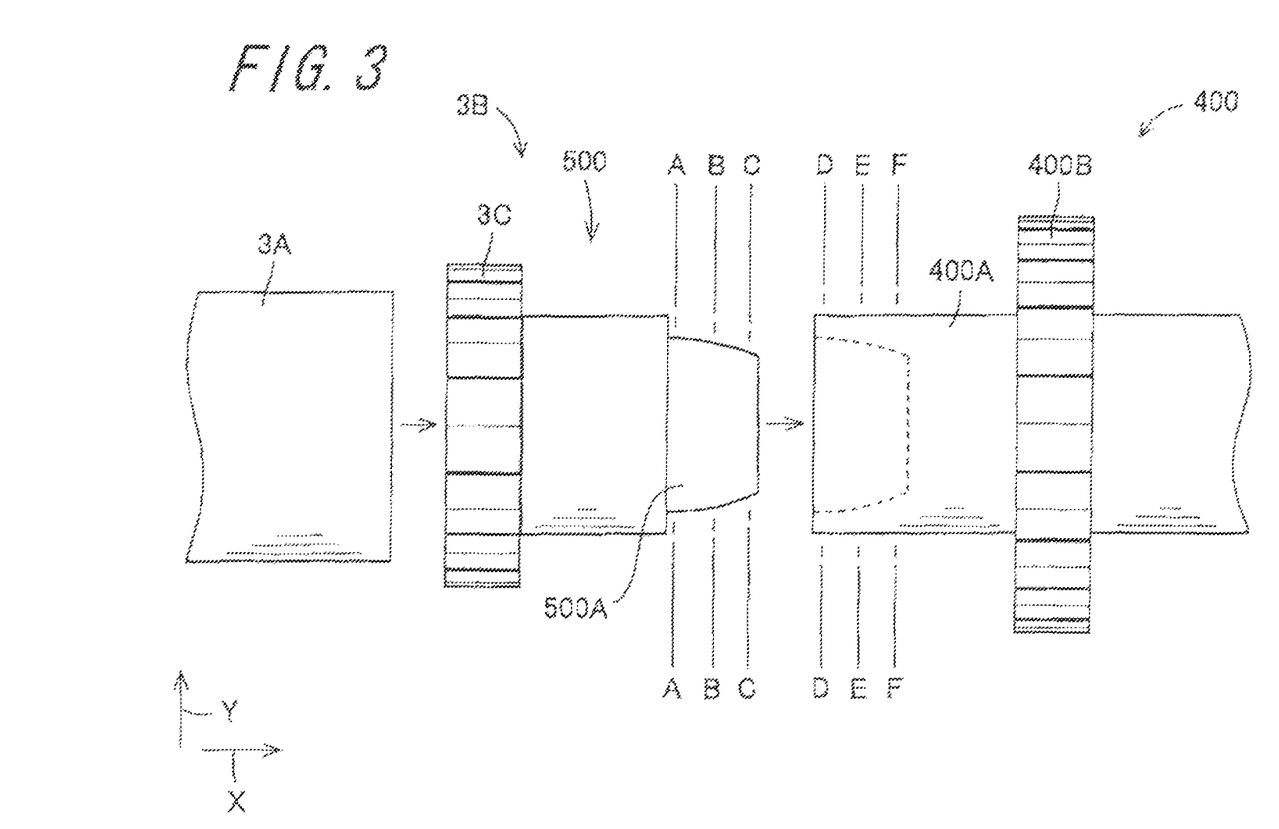
FIG. 3 is a view showing a concave member and a convex member.
Figure 4A:
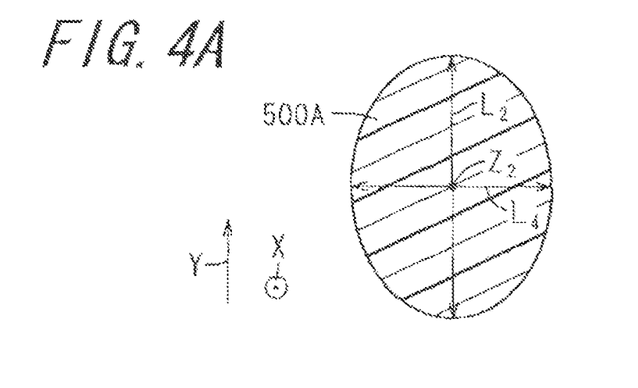
FIGS. 4A to 4C are views showing a cross-section of a convex portion of the convex member.
Figure 4B:
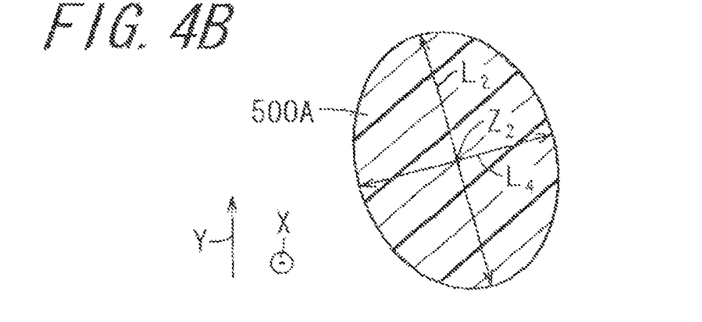
Figure 4C:
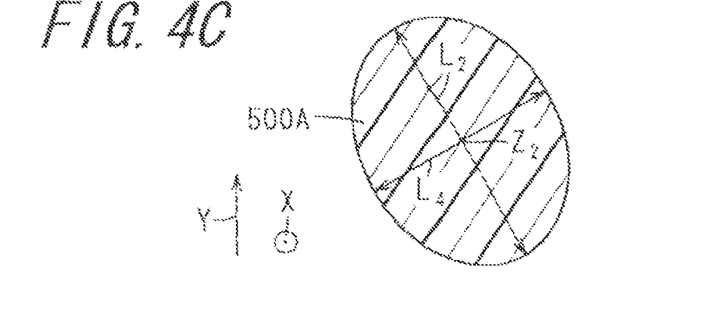
Figure 5A:
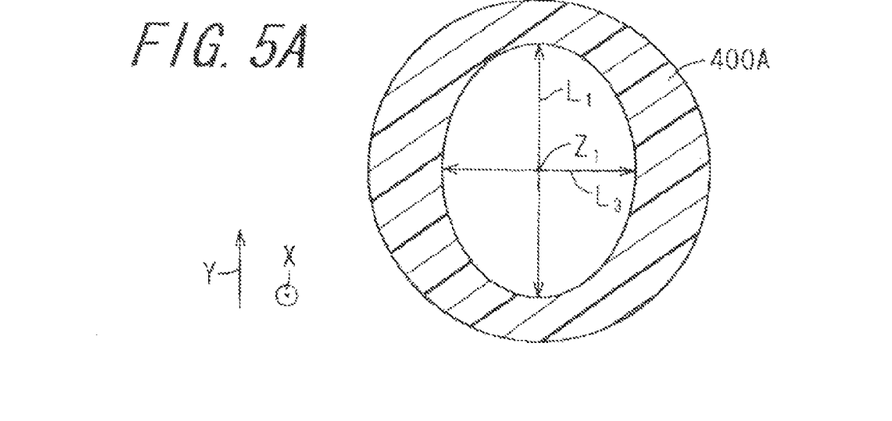
FIGS. 5A to 5C are views showing a cross-section of a concave portion of the concave member.
Figure 5B:
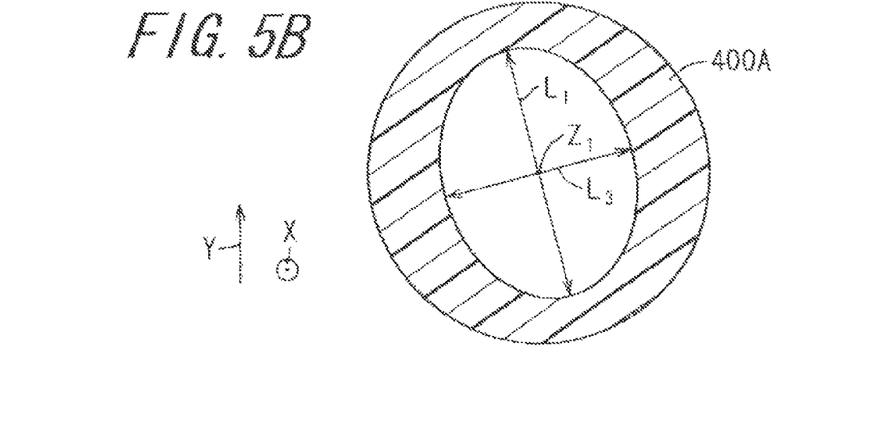
Figure 5C:
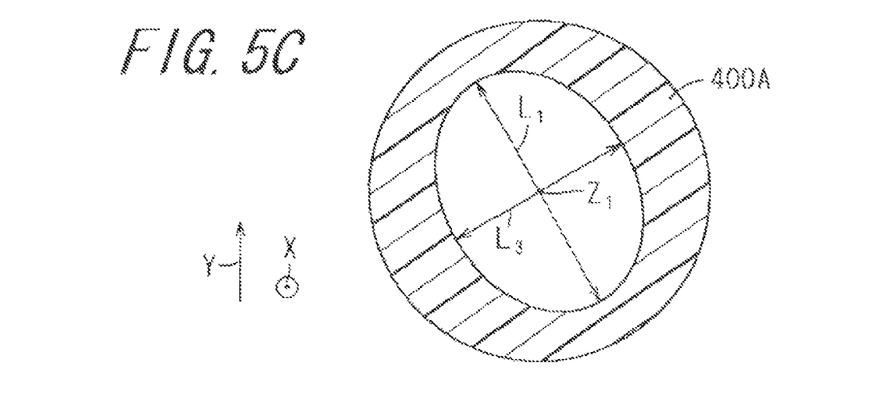

Next, the concave member 400 and the convex member 500, which are the rotation driving force transmitting member, will be described in detail. FIG. 3 is a view showing the concave member 400 and the convex member 500. FIGS. 4A to 4C are views showing a cross-section of the convex portion 500A of the convex member 500. FIG. 4A shows the cross-section when the convex portion 500A is taken along a plane indicated by the line A-A, FIG. 4B shows the cross-section when the convex portion 500A is taken along a plane indicated by the line B-B, and FIG. 4C shows the cross-section when the convex portion 500A is taken along a plane indicated by the line C-C. FIGS. 5A to 5C are views showing a cross-section of the concave portion 400A of the concave member 400, FIG. 5A shows the cross-section when the concave portion 400A is taken along a plane indicated by the line D-D, FIG. 5B shows the cross-section when the concave portion 400A is taken along a plane indicated by the line E-E, and FIG. 5C shows the cross-section when the concave portion 400A is taken along a plane indicated by the line F-F. In addition, in FIG. 3, FIGS. 4A to 4C, and FIGS. 5A to 5C, an arrow X indicates one direction of axial line directions of the photoreceptor drum 3, and an arrow Y indicates one direction of planar directions which are perpendicular to the axial line direction of the photoreceptor drum 3.

The convex member 500 is provided in the tip of the flange 3B, and the flange 3B is attached to the main body 3A by caulking, bonding, or the like in the one end (a downstream side end in the arrow X direction) of the axial line direction of the main body 3A of the photoreceptor drum 3. Materials of the convex member 500 and the flange 3B may include resin materials such as polycarbonate resin, ABS resin (acrylonitrile-butadiene-styrene copolymer resin), or polyacetal resin, but is not limited thereto. For example, the materials may include metal materials.

As shown in FIGS. 4A to 4C, the convex portion 500A of the convex member 500 is a twisted columnar body whose cross-section is ellipse. When a straight line passing through a centroid of the elliptical cross-section of the convex portion 500A is given as the axial line of the convex member 500, more specifically, the convex portion 500A is a columnar body in which the shape of the cross-section perpendicular to the axial line direction (the arrow X direction) of the convex member 500 is constantly same ellipse over the axial line direction, and in which an angle formed by a major axis direction of the elliptical cross-section and the arrow Y direction is continuously varied as going toward the one end (a downstream side in the arrow X direction) in the axial line direction of the convex member 500. In addition, in the embodiment, a true circle is not included in the ellipse. Moreover, in the embodiment, the axial line direction of the photoreceptor drum 3 is aligned with the axial line direction of the convex member 500.

Just like the convex member 500, the concave member 400 including the concave portion 400A which is fitted in the convex portion 500A of the convex member 500 is formed of resin materials such as polycarbonate resin, ABS resin, or polyacetal resin, or metal materials. The concave portion 400A is a member in which the cross-section is ellipse, and which encircles a twisted imaginary columnar body. For example, the imaginary columnar body which is encircled by the concave portion 400A is similar figure as the convex portion 500A.

In the embodiment, the space encircled by the concave portion 400A is similar figure as the convex portion 500A, and the major-axis length $L_1$ of the elliptical cross-section of the concave portion 400A is about 0.1 mm greater than the major-axis length $L_2$ of the elliptical cross-section of the convex portion 500A. However, the embodiment is not limited thereto. That is, the major-axis length $L_2$ of the elliptical cross-section of the convex portion 500A may be greater than a minor-axis length $L_3$ of the elliptical cross-section of the concave portion 400A, and be equal to or less than the major-axis length $L_1$ of the elliptical cross-section of the concave portion 400A.

The major-axis length $L_1$ of the elliptical cross-section of the concave portion 400A can be appropriately set within a range of 6 mm or more and 30 mm or less. The minor-axis length $L_3$ of the elliptical cross-section of the concave portion 400A can be appropriately set within a range of 4 mm or more and 27 mm or less. The major-axis length $L_2$ of the elliptical cross-section of the convex portion 500A can be appropriately set within a range of 6 mm or more and 30 mm or less. The minor-axis length $L_4$ of the elliptical cross-section of the convex portion 500A can be appropriately set within a range of 4 mm or more and 27 mm or less.

Variation in the angle formed by the major axis direction of the elliptical cross-section of the convex portion 500A and the direction of the arrow Y direction as going toward one end (the downstream side in the arrow X direction) in the axial line direction of the convex member 500, is referred to as a twisted amount [°/mm] of the convex portion 500A. In addition, a straight line passing through a centroid of the elliptical cross-section of the concave portion 400A is given as the axial line of the concave member 400. Variation in the angle formed by the major axis direction of the elliptical cross-section of the concave portion 400A and the direction of the arrow Y direction as going toward one end (the downstream side in the arrow X direction) in the axial line direction of the concave member 400, is referred to as a twisted amount [°/mm] of the concave portion 400A.

The twisted amount of the convex portion 500A is the same as that of the concave portion 400A, and the convex portion 500A and the concave portion 400A are twisted in the same direction. In addition, in the embodiment, when viewed from the main body portion 3A side of the photoreceptor drum 3, the convex portion 500A and the concave portion 400A are twisted in an opposite direction with respect to the rotation direction of the main body portion 3A as going the arrow X direction.

According to the rotation driving force transmitting member including the above-described convex member 500 and the concave member 400, when the motor section 300 starts rotation in the state where the convex portion 500A of the convex member 500 and the concave portion 400A of the concave member 400 are fitted in each other, a drawing force, which draws the convex member 500 toward the concave member 400 side, is generated. In addition, in the state where the drawing force is generated, the rotation driving force by the motor section 300 is transmitted to the photoreceptor drum 3 via the convex member 500 and the concave member 400.

At this time, due to the drawing force which is generated between the convex member 500 and the concave member 400, an arc portion of the elliptical cross-section of the convex portion 500A abuts against an arc portion of the elliptical cross-section of the concave portion 400A, and a centroid $Z_2$ of the elliptical cross-section of the convex portion 500A is aligned with a centroid $Z_1$ of the elliptical cross-section of the concave portion 400A. As a result, it is possible to rotate the photoreceptor drum 3 provided with the convex member 500 without eccentricity.

Moreover, when the arc portion of the elliptical cross-section of the convex portion 500A abuts against the arc portion of the elliptical cross-section of concave portion 400A, the impact at the time of abutment can be alleviated, and therefore the damage in the convex portion 500A is suppressed. In addition, the convex portion 500A is hardly damaged even when the convex portion 500A and the concave portion 400A are fitted in each other.

Moreover, since the convex member 500 and the concave member 400 are constituted so that the centeroid $Z_1$ and the centroid $Z_2$ are aligned with each other by abutment of the arc portion of the elliptical cross-section of the convex portion 500A against the arc portion of the elliptical cross-section of the concave portion 400A, even though the convex portion 500A is damaged, if the damage is minute, a portion of the arc portion of the elliptical cross-section of the convex portion 500A is remained. As a result, the misalignment does not occur in the abutment position between the convex portion 500A and the concave portion 400A, and the centroid $Z_1$ and the centroid $Z_2$ can be aligned with each other. Therefore, according to the rotation driving force transmitting member according to the embodiment, it is possible to suppress occurrence of a backlash in rotation of the photoreceptor drum 3.

In the embodiment, the ratio $L_2/L_4$ between the major-axis length $L_2$ and the minor-axis length $L_4$ of the elliptical cross-section of the convex portion 500A and the ratio $L_1/L_3$ between the major-axis length $L_1$ and the minor-axis length $L_3$ of the elliptical cross-section of the concave portion 400A are preferably in a range of 1.1 or more and 2.0 or less, and more preferably in a range of 1.1 or more and 1.5 or less. According the above-described configuration, the elliptical cross-section of the convex portion 500A and the elliptical cross-section of the concave portion 400A are shapes which are near to a true circle shape. As a result, when the arc portion of the elliptical cross-section of the convex portion 500A abuts against the arc portion of the elliptical cross-section of the concave portion 400A, the length of the abutted arc portion becomes long, and the impact at the time of abutment can be more alleviated. In addition, since the elliptical cross-sections of the convex portion and the concave portion are shapes which are near to a true circle shape, the fitting between the convex portion 500A and the concave portion 400A can be easily performed.

In addition, in the embodiment, it is preferable that the twisted amount of the convex portion 500A and the twisted amount of the concave portion 400A are 1°/mm or more and 15°/mm or less, If the twisted amounts are less than 1°/mm, the drawing force becomes weak, the centroid $Z_2$ and the centroid $Z_1$ are hardly aligned with each other. In addition, if the twisted amounts are more than 15°/mm, error in the manufacture easily occurs, and the centroid $Z_2$ and the centroid $Z_1$ are hardly aligned with each other. On the other hand, when the twisted amounts are 1°/mm or more and 15°/mm or less, the centroid $Z_2$ and the centroid $Z_1$ can be reliably aligned with each other.

In addition, in the embodiment, the twisted amount of the convex portion 500A and the twisted amount of the concave portion 400A are 7.5°/mm, and the lengths of the convex portion 500A and the concave portion 400A in the axial line direction (the arrow X direction) are about 4 mm. Therefore, in the convex portion 500A and the concave portion 400A, the angle formed by the arrow Y direction and the major-axis length of the elliptical cross-section is different by about 30° to each other in the one end in the axial line direction (the downstream side end in the arrow X direction) and the other one end in the axial line direction (the upstream side end in the arrow X direction). In addition, in the embodiment, the reason why the lengths of the convex portion 500A and the concave portion 400A in the axial line direction (the arrow X direction) are about 4 mm is that the convex portion 500A and the concave portion 400A are easily separated if the lengths are to be too short, and problem on the strength due to the relationship between the shaft diameter and the material occurs if the length are to be too long. However, in the embodiment, the lengths of the convex portion 500A and the concave portion 400A in the axial line direction (the arrow X direction) are limited to 4 mm, and, for example, can be appropriately set within a range of 2 mm or more and 10 mm or less.

In the embodiment, the convex member 500 is provided on the photoreceptor drum 3 and the concave member 400 is provided on the apparatus main body 110. However, according to another embodiment, the concave member 400 may be provided on the photoreceptor drum 3 and the convex member 500 may be provided on the apparatus main body 110.

In addition, according to still another embodiment, the developing section 2 may be included in the process cartridge 200, and moreover, the process cartridge 200 may be constituted so that the rotation driving force transmitted to the photoreceptor drum 3 is transmitted to the developing section 2 via the gears or the coupling members. Moreover, the convex member 500 (or the concave member 400) may be provided on the developing member 2 instead of the photoreceptor drum 3, and the developing member 2 may be rotated instead of the photoreceptor drum 3.

According to still another embodiment, the multifunctional peripheral 100 may be constituted so that the rotation driving force transmitted to the photoreceptor drum 3 is transmitted to the intermediate transfer belt driving roller 62 via the gears and the coupling members. In addition, the convex member 500 (or the concave member 400) may be provided on the intermediate transfer belt driving roller 62 instead of the photoreceptor drum 3, and the intermediate transfer belt driving roller 62 may be rotated instead of the photoreceptor drum 3.

In addition, the rotation driving force transmitting member according to the embodiment can be used in fields other than the field of the image forming apparatus. For example, the rotation driving force transmitting member according to the embodiment can be applied to components in which a exchange or a maintenance is regularly needed, and used in a driving force transmitting portion of a liquid-feed pump or an agitation device.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed:

1. A rotation driving force transmitting member disposed between a driving source which is rotated around an axial line, and a driven body, the rotation driving force transmitting member comprising:
   a concave member provided on one of the driving source and the driven body, the concave member including a concave member including a concave portion, which defines a twisted elliptical space, comprising an elliptical cross-section; and
   a convex member provided on the other of the driving source and the driven body, the convex member including a convex portion that has a twisted elliptical cross-section and which fits into the twisted elliptical space defined by the concave portion,
   wherein a rotation driving force of the driving source is transmitted to the driven body via the convex member and the concave member in a state where the convex member is subjected to a drawing force toward the concave member side, due to the rotation of the driving source in a state where the convex portion fits into the concave portion of the concave member.

2. The rotation driving force transmitting member of claim 1, wherein a shape of the cross-section of the convex portion of the convex member is an ellipse in which a ratio between a major-axis length and a minor-axis length of the ellipse is 1.1 or more and 1.5 or less, and
   a shape of the cross-section of the concave portion of the concave member is an ellipse in which a ratio between a major-axis length and a minor-axis length of the ellipse is 1.1 or more and 1.5 or less.

3. The rotation driving force transmitting member of claim 1, wherein a twisted amount of the convex portion of the convex member and a twisted amount of the concave portion of the concave member are 1°/mm or more and 15°/mm or less.

4. The rotation driving force transmitting member of claim 1, wherein the major-axis length of the elliptical cross-section of the convex portion is greater than the minor-axis length of the elliptical cross-section of the concave portion, and is equal to or less than the major-axis length of the elliptical cross-section of the concave portion.

5. The rotation driving force transmitting member of claim 1, wherein the major-axis length of the elliptical cross-section of the concave portion is set within a range of 6 mm or more and 30 mm or less and the minor-axis length of the elliptical cross-section of the concave portion is set within a range of 4 mm or more and 27 mm or less, and
   wherein the major-axis length of the elliptical cross-section of the convex portion is set within a range of 6 mm or more and 30 mm or less and the minor-axis length of the elliptical cross-section of the convex portion is set within a range of 4 mm or more and 27 mm or less.

6. A photoreceptor drum that is provided in an image forming apparatus comprising one of the convex member and the concave member which is provided in the rotation driving force transmitting member of claim 1 and a motor serving as a driving source, and that serves as a driven body which is rotated by a rotation driving force of the motor, the photoreceptor drum comprising:
   a flange having the other one of the convex member and the concave member provided in an end in an axial line direction of the photoreceptor drum, and constituted to align the axial line direction of the photoreceptor drum with an axial line direction of the other one member.

7. A process cartridge comprising:
   the photoreceptor drum of claim 6; and
   a charging section that charges the photoreceptor drum.

8. The process cartridge of claim 7, further comprising a cleaning section that cleans the surface of the photoreceptor drum.

9. The process cartridge of claim 8, wherein the rotation driving force, which is transmitted to the photoreceptor drum, is transmitted to the cleaning section.

10. The process cartridge of claim 7, further comprising a developing section that supplies a toner to the photoreceptor drum.

11. The process cartridge of claim 10, wherein the rotation driving force, which is transmitted to the photoreceptor drum, is transmitted to the developing section.

12. A process cartridge that is provided in an image forming apparatus comprising one of the convex member and the concave member which is provided in the rotation driving force transmitting member of claim 1 and a motor that serves as a driving source, the process cartridge comprising:
  a developing section that serves as a driven body which is rotated by the rotation driving force of the motor, and has the other one of the convex member and the concave member.

13. An electrophotographic image forming apparatus comprising:
  one of the convex member and the concave member that is provided in the rotation driving force transmitting member of claim 1;
  a motor that serves as a driving source; and
  a process cartridge comprising:
    a photoreceptor drum that serves as the driven body which is rotated by the rotation driving force of the motor, the photoreceptor drum comprising a flange having the other one of the convex member and the concave member provided in an end in an axial line direction of the photoreceptor drum, and constituted to align the axial line direction of the photoreceptor drum with an axial line direction of the other one member; and
  a charging section that charges the photoreceptor drum.

14. The image forming apparatus of claim 13, further comprising an intermediate transfer section including an intermediate transfer belt and an intermediate transfer belt driving roller which rotates the intermediate transfer belt, and
  the rotation driving force, which is transmitted to the photoreceptor drum, is transmitted to the intermediate transfer belt driving roller.

15. An electrophotographic image forming apparatus comprising:
  one of the convex member and the concave member provided in the rotation driving force transmitting member of claim 1;
  a motor that serves as a driving source; and
  an intermediate transfer section including an intermediate transfer belt driving roller that serves as a driven body which is rotated by the rotation driving force of the motor and an intermediate transfer belt which is rotated by the intermediate transfer belt driving roller,
  the intermediate transfer belt driving roller having the other one of the convex member and the concave member.

* * * * *